Jan. 29, 1929.  
F. HEITZLER  
1,700,497  
APPARATUS FOR USE IN IDENTIFYING PRECIOUS STONES  
Filed April 28, 1927   3 Sheets-Sheet 1
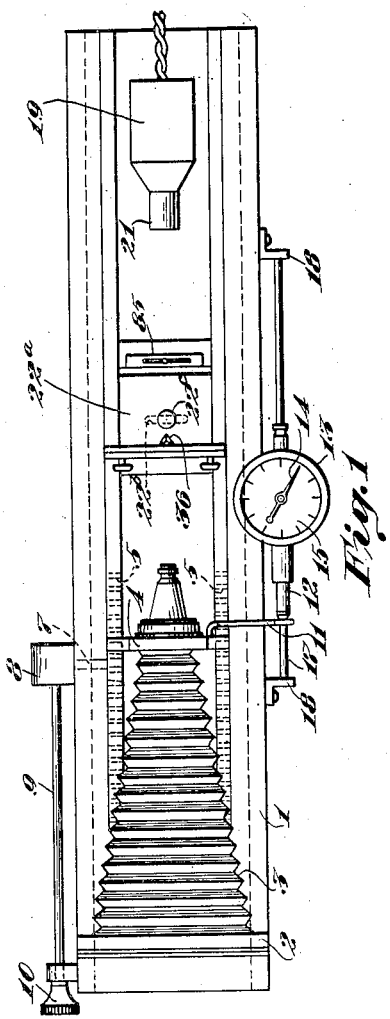
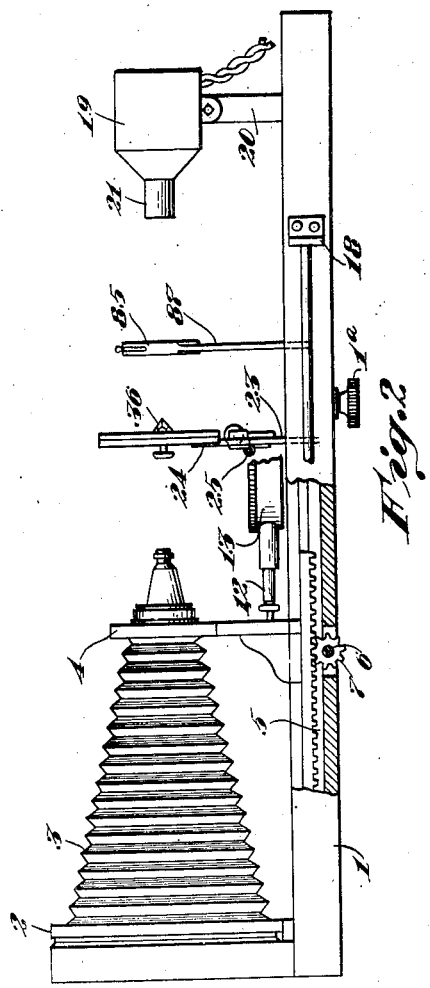
Inventor  
Frank Heitzler

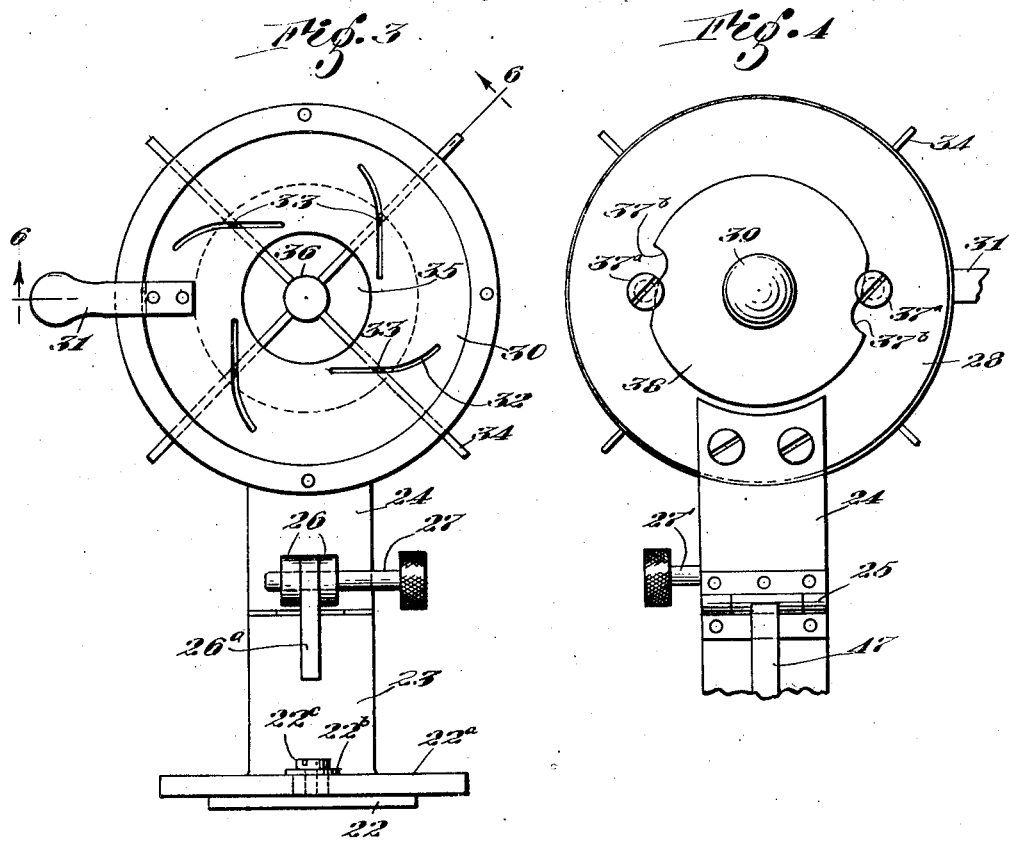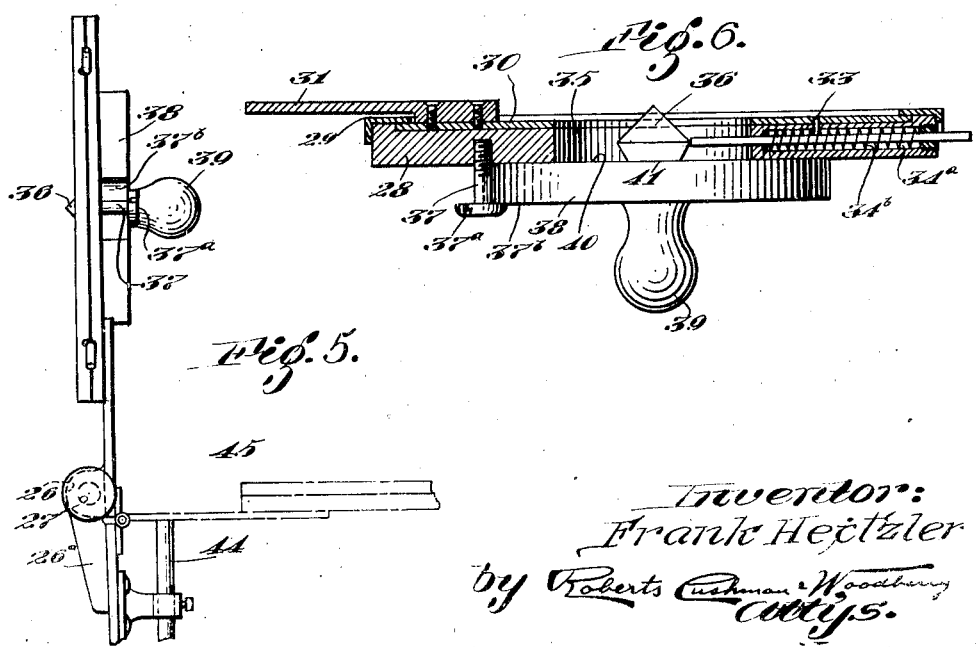

Jan. 29, 1929.  1,700,497
F. HEITZLER
APPARATUS FOR USE IN IDENTIFYING PRECIOUS STONES
Filed April 28, 1927   3 Sheets-Sheet 3
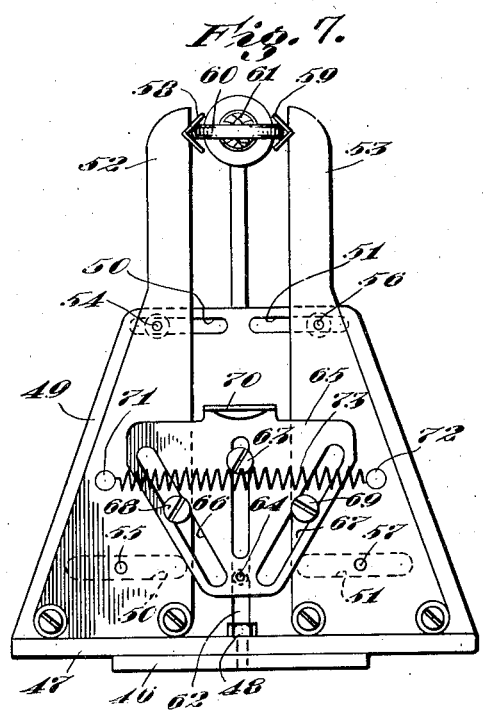
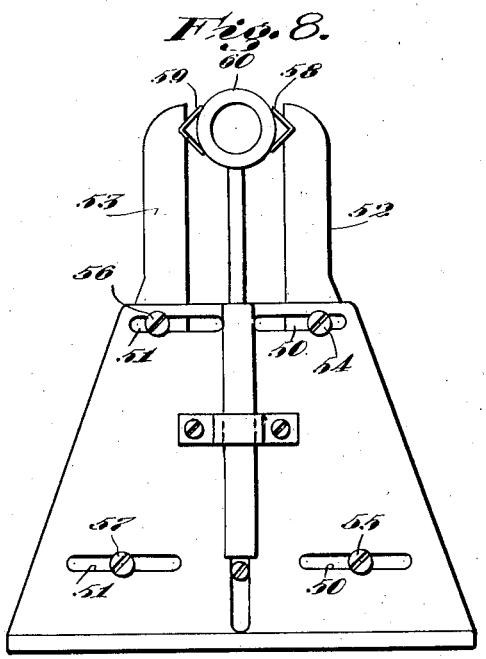
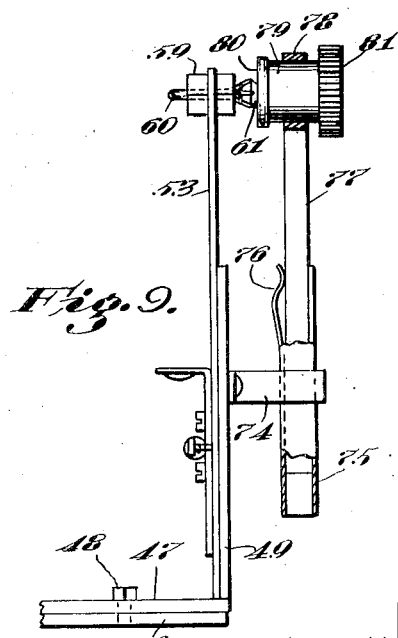
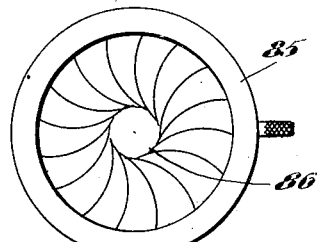
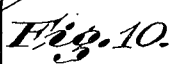
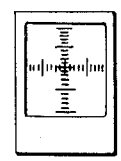
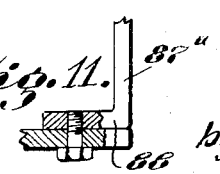
Inventor
Frank Heitzler
by Roberts Cushman Woodbury
Attys.

Patented Jan. 29, 1929.

1,700,497

UNITED STATES PATENT OFFICE.

FRANK HEITZLER, OF BOSTON, MASSACHUSETTS.

APPARATUS FOR USE IN IDENTIFYING PRECIOUS STONES.

Application filed April 28, 1927. Serial No. 187,212.

This invention pertains to apparatus for use in identifying precious stones, particularly those of a transparent nature, in accordance with the method disclosed and claimed in my copending application Serial No. 187,211, filed April 28, 1927. One of the greatest difficulties incident to the recovery of precious stones which have been lost or stolen is positive identification of such stones. This is due first to the fact that aside from weight and style of cut, which of course are characteristics common to many stones of a given kind, the only identifying features usually available are color, and water or brilliancy. Since there is seldom any fixed standard of color available with which a given stone may be compared to facilitate identification and since the brilliancy of a stone is a purely relative term, it is often very difficult, if not impossible, to make any positive identification of the stone which is suspected of having been stolen.

It has long been recognized that most precious stones of natural origin have certain distinct characteristics when examined microscopically, for example, imperfections or abnormal peculiarities in cutting but more particularly interruptions of their optical homogeneity, all of such distinct peculiarities being hereinafter referred to for convenience as "defects." These defects may consist, for example, of irregularities in cutting, as above noted, but more especially such interruptions of their optical homogeneity as incipient fractures and imperfections in crystallization; included bubbles of air or gases, specks or flakes of metallic oxides, or other opaque matter; and in the case of diamonds, small particles of uncrystallized carbons which appear as black spots. It is very rare indeed that a stone, particularly a diamond, is found which does not have one or more of these defects, and it is most unusual to find a stone of any size which does not contain several such defects often of different kinds. Of course, if these defects are of great size, they may detract from the value of the stone, but the stone is usually so cut as to avoid so far as possible the large defects, and the remaining smaller defects, which are not usually visible to the eye or even to a low power microscope, do not seriously or even appreciably detract from the appearance of the stone. Thus while for convenience I employ the word "defect" in describing these peculiarities of the stone, it is with the understanding that the optical peculiarities thus referred to need not necessarily be of a character such as to decrease the value of the stone.

As the inclusion of these defects is entirely fortuitous, it is substantially impossible or at least highly improbable that any two stones will be found containing the same defects in the same relative positions, and thus were it possible to make note of the defects in a given stone and to keep a record of such defects, a very definite and acurate means of identification would be available.

As a usual thing precious stones employed for jewelry are quite small (a diamond of one-quarter inch diameter being quite unusually large and most of them being much smaller than this) while the defects which must be relied upon for identification are of microscopic size and only visible through a microscope of high power. Furthermore, the mere observation of these defects is not sufficient since it affords no standard of comparison by means of which the stone may be identified at a later time.

In accordance with my present method I prepare a photo-micrograph, preferably using a magnification of the order of 250 diameters, although I do not wish to restrict myself to this particular magnification, it being possible that good results may be secured with either a higher or lower power. In order to obtain desirable results and to produce a photographic print which will be of any value for later comparison for identification purposes, I find it desirable to light the stone in such a manner and to employ lenses of such character as to reduce as far as possible contrasting effects in the negative and print, this procedure being quite contrary to the usual practice in making photo-micrographs. After such a photo-micrograph has been made and microscopically compared to the stone for its accuracy, such photo-micrograph may be filed away in any suitable custody, for example, by the seller of the stone, by the purchaser or, by the insurance company. I further contemplate that this process may be applied upon the entry of the stone into this country and that the photo-micrographic record thus made may be kept at the customs house and that a duplicate may be furnished to each successive purchaser of the stone. Thus if at any subsequent time the stone should be stolen or lost such print or prints would furnish an accurate and undeniable standard of comparison with which a stone might be compared for identification purposes.

In making such comparison it would simply be necessary to take the photo-micrograph, supposed to correspond to this suspected stone, and to examine the stone under microscopic power sufficient to exhibit defects clearly. Preferably the photo-micrographs should in each case bear a legend showing the amount of magnification employed in making it, together with other data, for example, the distances of the various defects from a fixed datum point of the stone, and in addition the print may bear other data as is often furnished to the purchaser of a precious stone, for example, a statement of the weight, style of cutting, color, etc.

While the above system of identification thus briefly outlined appears quite simple (although I believe it to be novel) I have found through a long course of experiments that the production of satisfactory photo-micrographs of precious stones, and particularly diamonds, is not at all easy if such photo-micrographs are to form reliable standards of comparison, as above described. In the first place the irregular surface presented by the facets of the cut stone, and in the case of a diamond particularly the fact of its double refractive properties makes it exceedingly difficult to produce a photo-micrograph clearly disclosing the depths of the stone throughout its entire area. In the second place the defects which occur in such a stone do not necessarily lie in a single plane parallel to the plane of the photograph but in fact usually occur in planes spaced from one another throughout the depth of the stone.

Lenses used for photo-micrography are necessarily of such character that the depth of focus is exceedingly short in order to obtain the desired clearness of definition, it being a well known principle of optics that any attempt at increase in depth of focus necessarily results in reducing definition. Thus in order to focus sharply upon a defect which occurs, for example, near the top or front face of the stone, the lens will not produce a sharp image (and often forms no image at all) of defects lying but a short distance, for example one-half of a millimeter, below or behind the plane of the selected defect. Thus if, for example, a large stone having a defect near its front surface were photographed for identification purposes and the lens were so focused as to show this defect at the front of the stone, it would fail to show other defects so that this single defect would ordinarily constitute the only means of identification. While this might be of some utility, it is not all that could be desired since there is at least a very remote possibility that two stones might be found having a single defect of substantially the same shape and kind and in the same location. It is thus desirable in order that the process may be of real commercial value that the photo-micrograph show substantially all or at least several of the defects in the stone. Accordingly my preferred method consists in making such photo-micrographs in which defects occurring at different planes of the stone are shown upon the same print and with substantially the same sharpness of definition.

To accomplish this result I prefer to employ the apparatus hereinafter described in detail. By means of this apparatus, I first examine the stone microscopically to determine defects lying for example at or near the front or top surface of the stone. I then vary the relative position of the stone and lens so as to focus upon a plane of the stone which is deeper within the latter and then again examine the stone for defects at this plane. I may thus continue with a series of settings of the lens until I have determined with accuracy those planes in which substantial defects are to be found, noting and recording the position of each such plane. I then expose a photographic plate to a magnified image of the stone, such image being that of the first plane in which a defect was found. After exposing the plate to this image I readjust the camera lens so as to impose upon the plate the image of the next plane in which I have previously found by exact measurement that defects occur. I expose the same plate again to this image, and may if necessary continue, by repeated exposures upon the same plate, to register images of all of those planes of the stone in which substantial defects occur.

Upon development of this exposed photographic plate I find that it shows substantially all of the defects occurring throughout the depth of the stone, clearly and with sharp definition and in their proper relative positions. This negative may be used to make suitable prints, and since as above described it is seldom that the stone does not exhibit more than one defect, such a print showing all of the defects in one view, is exceedingly valuable as a means of identification of the stone since the various defects occurring in the stone are usually of distinctive shape and are at definite distances from some fixed datum point, for example, the front surface of the stone. Oftentimes the defects, for example, cracks or flaws, are of curious and grotesque outline while the spots or specks of carbon usually occur in flocks or groups in which the relative arrangement of individual particles is quite distinct.

As a variant of the above method I may make successive exposures upon different plates and after developing superpose the several negatives and print through them all at the same time, but except in unusual cases I prefer the first procedure as more simple and accurate.

While my method may undoubtedly be carried into effect in various ways it is essential from the commercial standpoint that it be capable of use by relatively unskilled persons and that it be possible to prepare composite photo-micrographs quickly at relatively low cost. With these objects in view I have designed the apparatus shown in the accompanying drawings, such apparatus being highly effective for the purpose and wholly practical from the commercial standpoint, although I wish it to be understood that the apparatus disclosed is merely illustrative of various devices which undoubtedly may be employed for carrying the process into effect.

In the drawings,

Fig. 1 is a plan view of my improved apparatus for making photo-micrographs of precious stones;

Fig. 2 is a side elevation partly in vertical section of the same apparatus;

Fig. 3 is a rear elevation to large scale illustrating a device for holding unmounted cut stones in proper position for examination and for making photo-micrographs;

Fig. 4 is a fragmentary front elevation of the device shown in Fig. 3;

Fig. 5 is an elevation showing the left-hand side of the device shown in Fig. 3;

Fig. 6 is a section substantially on the line 6—6 of Fig. 3, but to larger scale;

Fig. 7 is a rear elevation illustrating a modified form of holder adapted for holding mounted stones;

Fig. 8 is a front elevation of the holder shown in Fig. 7;

Fig. 9 is an elevation of the left-hand side of the device shown in Fig. 7;

Fig. 10 is a front elevation of an adjustable diaphragm for use in modifying the beam of light directed toward the stone;

Fig. 11 is a side elevation illustrating modified means for supporting the diaphragm of Fig. 10; and Fig. 12 is a front elevation of the focusing screen of the camera.

While my novel method may doubtless be carried out by the use of other means than that herein disclosed, I have found the apparatus illustrated in the accompanying drawings to be very satisfactory for the purpose and to give excellent results. This apparatus comprises an elongate base or bed 1 which may be made of wood, metal or other suitable material and which supports the camera—the means for holding and lighting the stone—and other accessories described hereinafter more fully. Preferably the camera is mounted upon one end of this base or bed 1 and comprises the backboard 2 connected by the bellows 3 to the front or lens board 4. The front board 4 is mounted upon a support sliding on or in suitable guides extending longitudinally of the base 1 and this support is furnished with one or more racks 5 engaging a pinion or pinions 6 carried by a transverse shaft 7 mounted in bearings in the bed 1. This shaft projects laterally beyond the bed and is connected to suitable reduction gearing, not shown, contained within the box or casing 8. This reduction gearing may comprise worm wheels and gears or such other mechanism as is usual for producing a very slow movement of a driven part. An actuating shaft 9 extends into the casing 8 and is connected to the reduction gearing, such shaft 9 preferably extending to a point adjacent to the backboard 2 of the camera and being furnished with a knurled knob or disk 10 by means of which the shaft may be turned. By turning this shaft the front or lens board of the camera may be moved very slowly and with great accuracy.

The front board 4 is preferably provided with a laterally extending bracket arm 11 which normally engages a sliding actuator bar 12 of a micrometer indicator 13. This micrometer indicator may be of any usual type, preferably reading to one hundredths of a millimeter, and is furnished with an index needle 14 cooperating with a scale 15. Preferably the scale is carried by a movable ring so that the zero point of the scale may be adjusted. This type of micrometer indicator is old and well known and in itself forms no part of the present invention. Preferably this indicator is bodily adjustable longitudinally of the bed 1 but is normally fixed in position. As one convenient means of mounting the indicator, I fix a rod 17 by means of brackets 18 to the edge of the bed 1, the rod being spaced from the bed, and by means of any suitable clamp (not shown) secure the indicator to the rod.

The lamp 19 is mounted on a standard 20, preferably adjustably secured to the bed 1 and the lamp may be provided with reflectors and with condensing lenses in a telescopic casing 21 so as to throw a parallel beam of light along the axis of the camera lens.

The holder for the stone to be photographed preferably comprises a base plate 22 adjustable longitudinally of the bed 1 and which may be secured in adjusted position by means of the set screw 1ᵃ. This plate 22 carries a second plate 22ᵃ having a transverse slot 22ᵇ for the reception of a locking screw 22ᶜ. The plate 22ᵃ is thus adjustable transversely of the bed 1 with respect to the plate 22. The plate 22ᵃ carries a substantially vertical standard comprising the lower portion 23 and the upper portion 24, said upper and lower portions being united by a hinge 25 permitting the upper portion, when desired, to be swung downward into a substantially horizontal position. In order to hold the upper part 24 of the standard in vertical alignment with the lower portion, I provide a pair of spaced ears or brackets 26 projecting from the part 24 and a lower ear or bracket 26ª projecting from the part 23, the bracket 26ª normally fitting between the brackets 26. The several brackets are furnished with aligned openings for the reception of a locking pin 27 which normally extends through the openings and thus holds the parts 23 and 24 in rigidly aligned position.

The upper part 24 of the standard comprises a disk-like portion 28 of annular form and this disk is provided with a rim-like flange 29 forming a retainer for a cam disk 30 which is disposed against the rear face of the disk 28. This cam disk 30 is free to rotate relatively to the disk 28 and I provide a handle 31 for turning the cam disk.

The cam disk 30 is furnished with a plurality of cam slots 32—four such slots being shown herein. Each of the cam slots 32 receives a rearwardly directed pin 33 carried by a corresponding holder bar 34. These bars 34 are preferably disposed radially with respect to the center of the disk 28 and slide in suitable guideways 34ª in the disk 28. Preferably the forward ends of the pins 33 project into radial slot 34ᶜ in the disk 28 to prevent rotation of the bars 34. Preferably these holders 34 are urged inwardly by means of springs 34ᵇ and their inner ends project into the central opening or aperture 35 in the disk 28. By actuation of the handle 31 the cam disk 30 is rotated and by means of the cam slots 32, acting upon the pins 33, the several holder bars 34 are simultaneously retracted, thus leaving a space between their inner ends for the reception of a stone 36. The inner ends of the bars 30 are of substantial thickness so as to provide broad surfaces for engagement with the edges of the stone, thus preventing the stone from tilting or tipping after the several bars have been brought into contact with it.

In order to facilitate the location of the stone between the ends of the holder bars and to make certain that the front face of the stone lies perpendicular to the axis of the lens I provide a cover plate 38 (Figs. 4, 5, and 6) having a handle 39, said plate being adapted to engage the front face of the disk 28. To hold this cover plate temporarily in position I provide a pair of pins 37 projecting forwardly from the disk 28, such pins preferably having enlarged heads 37ª adapted to overlie the forward surface of the cover plate 38. The pins 37 are spaced apart a distance slightly less than the diameter of the cover plate 38 so that it is possible to push said cover plate edgewise between the pins until it jams and is thus frictionally held. Preferably I provide the edge of the cover plate 38 with recesses 37ᵇ whose inner walls constitute curved cam surfaces disposed at diametrally opposed points and adapted to engage and to interlock with the pins 37.

The lower part 23 of the stone holder may be provided with a bracket comprising a vertical socket portion 44 which constitutes a stop for the upper part 24 of the standard when the latter is swung down into the dotted line position indicated in Fig. 5. This socket member 44 may have further utility as hereafter described.

The backboard 2 of the camera carries the focusing screen (Fig. 12) which may be of ground glass as is usual, but I preferably provide this screen with a graduated scale or scales 42 in which the graduations preferably extend in opposite directions from a zero point at the center, such zero point lying upon the optical axis of the lens.

Referring to Figs. 7, 8 and 9, I illustrate a modified holder designed to support a stone mounted in a ring or other setting. This device comprises a bottom plate 46 adapted in the same way as the plate 22, above described, to rest upon the bed 1 and to be secured in adjusted position by means of the set screw 1ª. This plate 46 carries a foot 47 which is adjustable transversely of the plate 46 and which may be held in adjusted position by means of the set screw 48. The foot 47 carries a vertical member or plate 49 perpendicular to the axis of the camera lens and which is provided with two pairs 50 and 51 respectively of substantially horizontal slots, one slot of each pair being adjacent to the upper portion of the plate 49 and the other slot of each pair being near the lower edge.

Oppositely movable holders 52 and 53 are mounted in contact with the rear surface of the plate 49. The holder 52 is provided with a pair of pins or screws 54 and 55 engaging the slots 50, while the holder 53 is provided with pins 56 and 57 engaging the upper and lower slots 51 respectively. The holders are thus constrained to move horizontally and in definite paths.

The holders 52 and 53 are provided near their upper ends with jaws 58 and 59 respectively. These jaws are preferably of V-shape and adapted to grip and to hold between them a jewel mounting, for example a ring 60 having the setting or stone 61.

The vertical plate 49 is provided with a centrally disposed vertical slot 62 which receives pins 63 and 64 projecting from a cam member 65 which is constrained by these pins to move in an accurately vertical path. This cam member 65 is furnished with a pair of symmetrically inclined cam slots 66 and 67 which receive pins 68 and 69 respectively projecting from the holders 52 and 53. A handle 70 projects from the cam member 65 for convenience in actuating the latter.

The holders 52 and 53 are furnished with projecting pins 71 and 72 which are connected by means of a tension spring 73. This spring tends to pull the holders 52 and 53 toward each other, thus causing their jaws 58 and 59 to engage the ring 60 with resilient pressure. By pulling upwardly on the handle 70 the cam member 65 is lifted and thus by the action of its cam slots 66 and 67 upon the pins 68 and 69, the holders 52 and 53 are simultaneously moved apart to permit removal of the ring from between the jaws or to permit a ring to be placed between the jaws.

Preferably the front face of the plate 49 is furnished with a projecting bracket 74 having a vertical socket portion 75 and preferably having a friction spring 76 adapted to engage the stem 77 of the stone locating device, the spring 76 holding such stem in vertical adjusted position.

The stone holding device preferably comprises an annulus 78 embracing a short cylindrical rod 79 provided at its rear end with a flat and accurately vertical face 80 and having a knurled head 81 at its opposite end. The stem 79 can slide in the annulus 78 but the surface 80 is always retained in vertical position.

In Fig. 10 I have illustrated a diaphragm device 85 for use in modifying the beam of light cast by the lamp 20. This diaphragm may comprise an outer ring and a series of movable leaves defining a central aperture 86 whose diameter may be varied in well known manner by moving the leaves. This diaphragm device is mounted upon the stem 87 which is adapted at times to occupy the socket 75 (or the socket 44 of the device shown in Fig. 5). Alternatively the stem 87 may be provided with a foot 88, as shown in Fig. 11, such foot being adapted to rest at any desired position upon the bed 1 and to be attached to the bed in selected position by a suitable set screw.

In using the above apparatus and assuming that an unmounted stone is to be photographed, I arrange the holder shown in Figs. 3, 4, 5 and 6 in the position shown in Figs. 1 and 2, and after applying the cover plate 38 by engaging its cam surfaces 37$^b$ with the pins 37$^a$, I remove the locking pin 27 and swing the upper part of the standard 24 down until it engages the stop 44. I then manipulate the handle 31 to retract the holders 34 and drop the stone 36 with its table 41 down onto the upper surface 40 of the cover plate 38. I then allow the springs 34$^b$ to retract the holders 34, thus gripping and centering the stone between the inner ends of the holders. The upper part 24 of the standard is then swung back to vertical position and locked by means of the pin 37 and the cover plate 38 is removed. The lamp 20 is then lighted and if desired the diaphragm device 85 may be arranged in position and so adjusted as to allow the beam of light to pass through the stone but without passing substantially beyond the edges of the stone.

The camera lens is now roughly adjusted until a magnified image of the stone appears dimly upon the screen and then by more careful adjustment a sharp image, preferably of the front face of the stone, is caused to appear upon the screen. The standard 24 may be adjusted, if necessary, in a lateral direction to bring the center of the stone to the zero mark on the screen. The image upon the screen is examined microscopically for the purpose of discovering defects, and if such defects are discovered, their position relative to the center of the screen is noted and recorded. It being assumed that the contact member 12 of the micrometer indicator is at this time in contact with the finger 11, the ring 16 of the indicator is adjusted to bring the zero mark of its scale in registry with the needle. The operator now further adjusts the lens of the camera until he forms upon the screen an image of a second plane of the stone in which a defect occurs. This defect is noted, its positions relative to the center of the screen recorded, and the reading of the needle of the micrometer indicator is also noted and recorded. This process may be carried on for further planes of the stone in which defects occur, suitable records being made in each instance.

The operator now racks the lens back to its original position, closes the shutter, introduces a loaded plate holder and accurately adjusts the lens until the micrometer indicator stands at zero. The lens shutter is now opened to expose the plate for the proper time and is then closed and the lens adjusted until the micrometer indicator needle stands at the point corresponding to that plane of the stone at which defects have previously been noted to occur. The shutter is again opened and the second exposure made upon the same plate. If other planes having defects were noted, further exposures may be made at these planes, if desired. The plate is now removed, developed and printed and a print made therefrom, and such print will be found to exhibit the defects occurring at each of the several planes at which exposures were made, the defects at each plane appearing with substantially equal clearness and definition in the print. If desired, this print may be provided with a legend indicating the relative positions of the planes at which exposures were made, the magnification employed, and such other data as may be useful in subsequent comparison of the print with the stone. The print thus provided may be preserved and when any question arises as to the identity of the stone, reference may be made to this print for comparison with the stone and thus identification may be made substantially certain.

In making a photo-micrograph of a stone in its setting, the arrangement shown in Figs. 7 to 9 may be substituted for that shown in Figs. 3 to 6 inclusive. Thus in using the device shown in Figs. 7 to 9 the operator raises the cam member 65 by means of the handle 70, thus retracting the holders 52 and 53, and places the ring between the jaws 58 and 59. Previous to thus placing the ring, the operator preferably inserts the stem 77 of the locating device in the socket 75 and when the stone is placed between the jaws its front or table surface is brought into engagement with the face 80 of the locating device, thus accurately determining the position of the front face of the stone with respect to a vertical plane so that such face may be accurately perpendicular to the axis of the lens. After the ring has been positioned and the jaws permitted to close, the stem 77 is withdrawn from the socket 75 thus exposing the front face of the ring to the camera lens, and the above operation of examining the stone for defects and making a composite photo-micrograph of the stone is repeated.

While the above apparatus is very desirable for the purpose, is simple in construction, and accurate in its results, I wish it to be understood that I am not restricted to the specific arrangement of parts herein described, but that various changes in proportion and relative arrangement of parts may be made and that equivalent devices may be substituted for those herein disclosed without departing from the spirit of the invention.

I claim:

1. Apparatus for use in the preparation of data for the identification of precious stones, said apparatus comprising a photo-micrographic lens, a focusing screen, a support for a stone, means for adjusting the lens toward or from the support, a micrometer indicator independent of the lens adjusting means, and means fixed relatively to the lens and engageable with the actuating element of the indicator for setting the latter and thereby accurately indicating the position of the lens.

2. Apparatus for use in the preparation of data for the identification of precious stones, said apparatus comprising a photo-micrographic lens, a normally fixed support comprising means for centering a stone with its front face substantially perpendicular to the axis of the lens, micrometer means for adjusting the lens toward and from the support, a micrometer indicator independent of said adjusting means for indicating the position of adjustment of the lens, and means for supporting the said indicator.

3. Apparatus for use in the preparation of data for the identification of precious stones, said apparatus comprising a photo-micrographic lens, a focusing screen, means for adjusting the lens toward and from the screen, a normally fixed support for a stone, a micrometer indicator independent of the lens adjusting means, said indicator being normally fixed relative to the support, said indicator having a movable actuating element, and a part moving with the lens directly engageable with said element whereby to indicate the position of adjustment of the lens.

4. Apparatus for use in the preparation of data for the identification of precious stones, said apparatus comprising a bed having a photo-micrographic camera mounted thereon, the camera having a front board adjustable longitudinally of the bed, a bar at one side of the bed, a micrometer indicator mounted upon the bar and adjustable longitudinally of the bed, said indicator having a slidable actuating rod, and a finger projecting laterally from the front board of the camera and normally engaging the actuating rod of the indicator.

5. Apparatus for use in the preparation of data for the identification of precious stones, said apparatus comprising a bed having a photo-micrographic camera mounted thereon, said camera having a lens adjustable longitudinally of the bed, a micrometer indicator normally fixed in position but bodily adjustable lengthwise of the bed, said indicator having a movable actuating member, a part moving with the lens engageable with said actuator member whereby to indicate the position of adjustment of the lens, and means mounted upon the bed for holding a stone centered with respect to the axis of the lens.

6. Apparatus for use in the preparation of data for the identification of precious stones, said apparatus comprising a bed having a photo-micrographic camera mounted thereon, the camera having a lens adjustable longitudinally of the bed, means for adjusting the lens longitudinally of the bed, a micrometer indicator independent of the lens adjusting means for indicating the adjustment of the lens, means carried by the bed for supporting said indicator, stone holding means mounted upon the bed, said means being adjustable in a substantially rectilinear path transversely of the bed, and means for directing a beam of light against a stone within the holding means.

7. Apparatus for use in the preparation of data for the identification of precious stones, said apparatus comprising a photo-micrographic lens, a support having means for centering a stone, means for adjusting the lens toward and from the support, said support comprising means providing guides for a plurality of rigid holders arranged to move in converging relation toward a given point, each holder having a cam follower element, and a cam device cooperable with the several follower elements for moving the holders simultaneously and to substantially the same amount away from said given point.

8. Apparatus for use in the preparation of data for the identification of precious stones, said apparatus comprising a support for holding a cut stone, said support having at least three substantially rigid non-resilient rods slidable endwise toward a common point, spring means tending to move the rods toward each other, and cam means for retracting the rods.

9. Apparatus for use in the preparation of data for the identification of precious stones, said apparatus comprising a support for holding a cut stone, said support having a plurality of spring actuated holders normally tending to move toward a common point for gripping the edges of a stone between them, each holder consisting of a substantially rigid non-resilient plate of substantial thickness, and cam means for simultaneously retracting said holders.

10. Apparatus for use in the preparation of data for the identification of precious stones, said apparatus comprising an annulus having radial guideways therein, a substantially rigid non-resilient holder sliding in each guideway, spring means tending to move the holders inwardly toward the center of the annulus, and a cam device for simultaneously moving the holders outwardly to receive a stone between them.

11. Apparatus for use in the preparation of data for the identification of precious stones, said apparatus including a photo-micrographic camera having a lens, a support for positioning a stone in front of the lens, said support comprising a pair of oppositely sliding holders, means for guiding the holders, each holder having a projecting stud, an actuating member having a cam slot engaging each of said studs, spring means tending to move the holders toward each other, and means for moving the actuating member whereby simultaneously to retract the holders.

12. Apparatus for use in the preparation of data for the identification of precious stones, said apparatus comprising a photomicrographic camera, and a stone supporting device, said device having a plurality of relatively movable spring actuated holders, means for simultaneously retracting the holders to admit a stone between them, and means temporarily engageable with the front face of the stone for determining the position of said front face when the holders are brought into engagement with the stone.

13. Apparatus for use in the preparation of data for the identification of precious stones, said apparatus including a photo-micrographic camera having a lens, and a support for positioning a stone in front of the lens, said support comprising a standard, holders movable in opposite directions, means for guiding the holders in their movement, cam means for simultaneously moving the holders away from each other to admit a stone between them, spring means for causing the holders to approach, and a removable member for determining the position of the front face of the stone as the holder moves toward operative position.

14. Apparatus for use in the preparation of data for the identification of precious stones, said apparatus including a photo-micrographic camera having a lens, a support for positioning a stone in front of the lens, said support comprising a standard having upper and lower parts, a plurality of movable holders carried by the upper part of the standard, the plane of movement of said holders normally being vertical, spring means tending to move the holders toward each other, cam means for retracting the holders, retaining means for holding the upper part of the standard in normal position, said retaining means being releasable to permit the standard to be tipped so that the plane of movement of the holders is substantially horizontal, and means providing a substantially horizontal flat surface for supporting a stone in position to be gripped between the holders.

15. Apparatus for use in the preparation of data for the identification of precious stones, said apparatus including a photo-micrographic camera having a lens, a support for positioning a stone in front of the lens, said support comprising a standard having a part provided with a plurality of guide slots therein, a movable holder corresponding to each guide slot, each holder having a stud projecting into one of said slots, a movable cam device having a cam slot corresponding to each holder, a stud projecting from each holder into one of said cam slots, spring means tending to move the holders toward each other, and means temporarily engageable with the front face of a stone for determining the location of said face as the holders move toward operative position.

16. Apparatus for use in the preparation of data for the identification of precious stones, said apparatus including a photo-micrographic camera having a lens, and a support for positioning a stone in front of the lens, said support comprising a standard having upper and lower parts hinged together, releasable locking means normally holding said parts in substantially vertical alignment, the upper part being movable to substantially horizontal position upon release of said locking means, spring pressed retractible holders carried by the upper part of the standard, said holders normally moving in a vertical plane, and a removable cover plate having a surface parallel to the plane of movement of the holders and adapted, when the upper part of the standard is moved to horizontal position, to support a stone while the holders are moving inwardly toward operative position.

17. Apparatus for use in the preparation of data for the identification of precious stones, said apparatus including a photo-micrographic camera having a lens, and a support for positioning a stone in front of the lens, said support comprising a standard having upper and lower parts hinged together, the upper part comprising a normally vertical annulus, releasable means for holding the upper part of the standard in normal position, the annulus having radial guideways, a holder sliding in each guideway, spring means tending to move the holders inwardly to stone gripping position, means for retracting the holders, a plurality of pins projecting from one face of the annulus, a cover plate removably engaging said pins, said cover plate having a flat surface parallel to the plane of movement of the holders, said surface, when the upper part of the support has been swung to horizontal position, constituting a table to support a stone while the holders are moving inwardly toward gripping position.

18. Apparatus for use in the preparation of data for the identification of precious stones, said apparatus comprising a bed, a photo-micrographic camera mounted thereon, said camera having a focusing screen provided with scale graduations thereon, and a stone centering support mounted upon the bed, a lens adjustable longitudinally of the bed, means for adjusting the lens, and a micrometer indicator independent of the lens adjusting means for indicating the position of adjustment of the lens.

19. Apparatus for use in the preparation of data for the identification of precious stones, said apparatus including a photo-micrographic camera having a lens, means for adjusting the lens for focusing, a micrometer indicator independent of the lens adjusting means for showing the position of adjustment of the lens and a support for positioning a stone in front of the lens, said support comprising a standard carrying stone gripping means, and a socket on the standard adapted removably to support a diaphragm having a light regulating aperture.

20. Apparatus for use in the preparation of data for the identification of precious stones, said apparatus including a photo-micrographic camera having a lens, means for adjusting the lens for focusing, micrometer indicator means independent of the lens adjusting means for indicating the position of adjustment of the lens, a support for positioning a stone in front of the lens, said support comprising a standard supporting stone centering means, a lamp for directing a beam of light against the rear surface of the stone, and means for supporting an apertured diaphragm for defining the beam of light.

Signed by me at Boston, Massachusetts, this 25th day of April, 1927.

FRANK HEITZLER.